(12) United States Patent    (10) Patent No.: US 11,600,816 B2
Guo et al.    (45) Date of Patent: Mar. 7, 2023

(54) NEGATIVE ELECTRODE, SECONDARY BATTERY AND DEVICE COMPRISING SAME

(71) Applicant: Contemporary Amperex Technology Co., Limited, Ningde (CN)

(72) Inventors: Mingkui Guo, Ningde (CN); Tiansheng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/150,096

(22) Filed: Jan. 15, 2021

(65) Prior Publication Data

US 2021/0143414 A1    May 13, 2021

Related U.S. Application Data

(63) Continuation of application No. PCT/CN2020/078166, filed on Mar. 6, 2020.

(30) Foreign Application Priority Data

Mar. 6, 2019    (CN) .......................... 201910169334.4

(51) Int. Cl.
*H01M 4/00*    (2006.01)
*H01M 4/36*    (2006.01)
(Continued)

(52) U.S. Cl.
CPC ........... *H01M 4/366* (2013.01); *H01M 4/133* (2013.01); *H01M 4/587* (2013.01);
(Continued)

(58) Field of Classification Search
CPC ...... H01M 4/366; H01M 4/133; H01M 4/587; H01M 4/02; H01M 10/0525;
(Continued)

(56) References Cited

U.S. PATENT DOCUMENTS

2014/0057166 A1* 2/2014 Yokoyama ........ H01M 10/0525
                                                                              427/113
2014/0287316 A1* 9/2014 Ahn ...................... H01M 4/587
                                                                              429/233
(Continued)

FOREIGN PATENT DOCUMENTS

CN    102324493 A    1/2012
CN    103633289 A    3/2014
(Continued)

OTHER PUBLICATIONS

PCT International Search Report and Written Opinion for International Application No. PCT/CN2020/078166, dated May 27, 15 pages. (ISR in English).

(Continued)

*Primary Examiner* — Nicholas P D'Aniello
(74) *Attorney, Agent, or Firm* — East IP P.C.

(57) ABSTRACT

The present application discloses a negative electrode, a secondary battery and a device comprising the same. The negative electrode includes: a current collector; a first active material layer close to the current collector, the first active material layer including a first active material; and a second active material layer disposed on a surface of the first active material layer away from the current collector, the second active material layer including a second active material; wherein the first active material and the second active material are independently oval-like particles with through holes and/or blind holes, and the first active material has an average pore size greater than that of the second active material.

17 Claims, 3 Drawing Sheets

(51) Int. Cl.
*H01M 4/133* (2010.01)
*H01M 4/587* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(58) Field of Classification Search
CPC ..... H01M 2004/027; H01M 2004/021; H01M 2004/026; H01M 4/131; H01M 4/134; H01M 4/386; H01M 4/485; H01M 4/1393; Y02E 60/10
USPC .......................................................... 429/231
See application file for complete search history.

(56) References Cited

U.S. PATENT DOCUMENTS

| | | | | |
|---|---|---|---|---|
| 2015/0280221 | A1* | 10/2015 | Abdelsalam | H01M 4/64 429/217 |
| 2016/0049637 | A1* | 2/2016 | Sohn | H01M 4/13 429/231.95 |
| 2017/0110729 | A1* | 4/2017 | Tsuchiya | H01M 4/587 |
| 2017/0110730 | A1* | 4/2017 | Tanaka | H01M 4/587 |
| 2017/0256776 | A1* | 9/2017 | Saka | H01M 4/505 |
| 2018/0219217 | A1* | 8/2018 | Park | H01M 4/139 |
| 2018/0287145 | A1* | 10/2018 | Lee | H01M 4/133 |
| 2018/0301753 | A1* | 10/2018 | Ose | H01M 4/386 |
| 2019/0027740 | A1* | 1/2019 | Lee | H01M 4/62 |

FOREIGN PATENT DOCUMENTS

| | | | |
|---|---|---|---|
| CN | 104126242 | A | 10/2014 |
| CN | 105374981 | A | 3/2016 |
| CN | 105849838 | A | 8/2016 |
| CN | 108701810 | A | 10/2018 |
| EP | 2991139 | A1 | 3/2016 |
| EP | 3399576 | A1 | 11/2018 |
| KR | 20140080837 | A | 7/2014 |
| WO | WO-2018070703 | A1 * | 4/2018 ............ H01M 4/36 |

OTHER PUBLICATIONS

Xiang et al. "Enhanced Rate Capability of Multi-Layered Ordered Porous Nickel Phosphide Film as Anode for Lithium Ion Batteries" Journal of Power Sources, vol. 196, Jun. 25, 2010. pp. 379-385.
Chinese Office Action for Application 201910169334.4 dated Mar. 6, 2019.
The extended European search report for European Application No. 22168100.0, dated May 3, 2022, 7 pages.
European Search Report for Application 20766175.2 dated Aug. 31, 2021.

* cited by examiner

NEGATIVE ELECTRODE, SECONDARY BATTERY AND DEVICE COMPRISING SAME

CROSS-REFERENCE TO RELATED APPLICATION

This application is a continuation of International Application No. PCT/CN2020/078166, filed on Mar. 6, 2020, which claims priority to Chinese Patent Application No. 201910169334.4 filed on Mar. 6, 2019, both of which are incorporated herein by reference in their entireties.

TECHNICAL FIELD

This application belongs to the technical field of energy storage devices, and specifically relates to a negative electrode, a secondary battery and a device comprising the same.

BACKGROUND

Secondary batteries represented by lithium-ion secondary batteries complete the charging and discharging process by means of reciprocating intercalation and deintercalation of active ions between positive and negative active materials, and have become an important energy source. For example, with the rapid popularity of new energy vehicles, the market demand for power secondary batteries will show explosive growth. This brings opportunities for the development of the secondary battery industry, and also poses a severe challenge to the cycle lives of secondary batteries. In order to enhance the market competitiveness of secondary batteries, it is indeed necessary to prolong their cycle lives.

SUMMARY

The design of a negative electrode will directly affect the performance of a secondary battery. The existing negative electrode usually has a uniform negative electrode film on one or two sides of an electrode current collector. However, the inventors' research has found that the negative electrode swells during battery cycle, resulting in insufficient electrolyte infiltration, which causes rapid capacity fade of the battery.

The inventors further found that, by reducing the packing compactness of active material particles in the negative electrode to increase the liquid absorption capability of the negative electrode, the cycle life of the secondary battery can be improved. However, the thickness of the negative electrode will be increased, which disadvantageously reduces the energy density of the secondary battery. In addition, a problem of poor contact between the active material particles may occur, which affects the electron conduction of the negative electrode, thereby reducing the dynamic performance of the secondary battery. Alternatively, by adding more electrolyte to the secondary battery, the electrode can maintain a sufficient electrolyte content during the cycle, so that the cycle life of the secondary battery can be prolonged to a certain extent, however, the higher content of electrolyte added increases the internal pressure of the battery, which will cause cycle expansion problem of the battery and affect the safety performance of the battery. In addition, using more electrolyte also increases the cost of the battery.

The inventors have conducted a lot of research to improve the traditional negative electrode, so that the negative electrode has good accumulation performance of active material particles, while its own liquid absorption and storage capacity can be increased, thereby obtaining a secondary battery with high energy density and a long cycle life.

Therefore, a first aspect of the present application provides a negative electrode, including:

a negative electrode current collector;

a first active material layer close to the negative electrode current collector, the first active material layer including a first active material; and a second active material layer disposed on a surface of the first active material layer away from the negative electrode current collector, the second active material layer including a second active material;

wherein the first active material and the second active material are independently oval-like particles with through holes and/or blind holes, and the first active material has an average pore size greater than that of the second active material.

A second aspect of the present application provides a secondary battery, including the negative electrode according to the first aspect of the present application.

A third aspect of the present application provides a device, including the secondary battery according to the second aspect of the present application.

Compared with the prior art, the present invention at least has the following beneficial effects:

It is surprisingly found that the negative electrode of the present application uses a negative electrode film with a composite layer structure, wherein the first active material in the first active material layer and the second active material in the second active material layer are oval-like particles with through holes and/or blind holes, and the average pore size of the first active material is greater than that of the second active material, so that the negative electrode has good accumulation performance of active material particles, while its own liquid absorption and storage capacity can be greatly increased. Therefore, the negative electrode of the present application prolongs the cycle life of the secondary battery comprising the same on the premise of high energy density. The device of the present application includes the secondary battery provided by the present application, and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

In order to make the purpose, technical solutions, and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Negative Electrode

First, a negative electrode provided in the first aspect of the present application is explained. The negative electrode comprises: a negative electrode current collector; a first active material layer close to the negative electrode current collector, the first active material layer comprising a first active material; and a second active material layer disposed on a surface of the first active material layer away from the negative electrode current collector, the second active material layer comprising a second active material; wherein the first active material and the second active material are independently oval-like particles with through holes and/or blind holes, and the first active material has an average pore size greater than that of the second active material.

Figure 1:
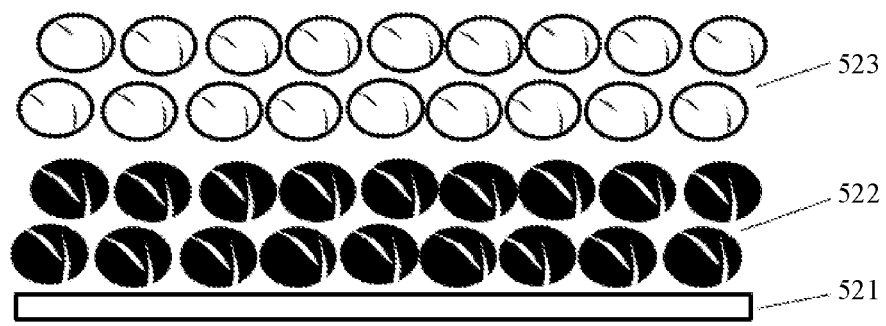
FIG. 1 is a schematic structural diagram of a negative electrode according to some embodiments of the present application.

FIG. 1 is a schematic structural diagram of a negative electrode as an example. The negative electrode comprises a negative electrode current collector 521, a first active material layer 522 formed on the negative electrode current collector 521, and a second active material layer 523 formed on a surface of the first active material layer 522 away from the negative electrode current collector 521. It is understandable that a negative electrode film with a composite layer structure comprising the first active material layer and the second active material layer may be formed on one side of the negative electrode current collector, or formed on two opposite surfaces of the negative electrode current collector in the thickness direction thereof.

The term "through hole" refers to a hole that penetrates an active material particle.

The term "blind hole" refers to a hole that extends inward to a predetermined depth from the surface of an active material particle, but does not penetrate the active material particle.

The first active material and the second active material are independently oval-like particles with through holes and/or blind holes, in other words, the first active material is oval-like particles, and has a porous structure including one or more of through holes and blind holes; and the second active material is oval-like particles, and has a porous structure including one or more of through holes and blind holes. The selection of the morphology and pore structure of the first active material is independent from the selection of the morphology and pore structure of the second active material.

Exemplary test methods for the average pore size of the active material can refer to the standard GB/T19587-2017 (Determination of the specific surface area of solids by gas adsorption using the BET method), and Part 2 of GB/T21650.2-2008 (Pore size distribution and porosity of solid materials by mercury porosimetry and gas adsorption-Part 2: Analysis of mesopores and macropores by gas adsorption). For example, the average pore size of the active material particles can be tested by means of micromeritics TriStar™ II 3020 instrument, USA.

After a lot of research, the inventors found that, when the negative electrode adopts a negative electrode film with a composite layer structure, and the first active material in the first active material layer and the second active material in the second active material layer adopt oval-like particles, the accumulation performance between the particles can be improved, a good contact between the particles can be achieved, and pores suitable for electrolyte infiltration are further formed. The first active material and the second active material also have a porous structure including one or more of through holes and blind holes, the second active material layer away from the negative electrode current collector adopts the second active material with a smaller average pore size, and the first active material layer close to the negative electrode current collector adopts the first active material with a larger average pore size. This combined structural feature can greatly increase the liquid absorption and storage capacity of the negative electrode itself. Therefore, the negative electrode of the present application can significantly alleviate cycle deterioration caused by insufficient electrolyte infiltration and prolong the cycle life of a secondary battery comprising the same while ensuring high energy density of the battery. More preferably, the negative electrode of the present application not only maintains high electronic conductivity, but also improves its active ion transport performance, so the battery can also have excellent dynamic performance.

The inventors also found that when the negative electrode adopts the negative electrode film with a composite layer structure, the cracking problem of the active material layers can also be effectively solved. The reason is that two or more active material layers are coated layer by layer, which reduces the internal stress of the active material layers during the drying process of the negative electrode, thereby solving the cracking problem caused by the increase of coating weight. A continuous conductive network formed in the negative electrode film can further prolong the cycle life and improve the dynamic performance of the battery.

In some preferred embodiments, the porosity of the first active material is greater than that of the second active material. The inventors found that the first active material used in the first active material layer has a larger average pore size and a higher porosity, so that the first active material layer has stronger liquid absorption and retention for an electrolyte. In addition, the second active material used in the second active material layer is denser, with a smaller average pore size and a lower porosity, which can ensure a higher energy density of the negative electrode and further improve the liquid storage capacity of the negative electrode. In particular, the negative electrode can still maintain relatively high electrolyte retention when its volume expands during the cycle. Therefore, the negative electrode can further improve the cycle performance of the battery with a higher energy density. More preferably, the dynamic performance of the battery can also be improved.

The average particle size $D_v50$ is a corresponding particle size when the cumulative volume distribution percentage of particles reaches 50%. The particles with a larger average particle size $D_v50$ are disposed more loosely, which can increase the liquid storage rate of an electrode plate, but would affect the electronic conductivity between the particles. In some embodiments, the average particle size $D_v50$ of the first active material is preferably from 8 to 18 μm, more preferably from 10 to 16 μm. The $D_v50$ of the first active material within an appropriate range can improve the liquid absorption and storage capacity of the negative electrode, and ensure that the negative electrode has high active ion and electron transport performance, so that the battery has a long cycle life and high dynamic performance. The first active material having an appropriate $D_v50$ can also increase the proportion of the active material in the first active material layer per unit volume, thereby helping to increase the energy density of the battery.

In some embodiments, the average particle size $D_v50$ of the second active material is preferably from 5 to 15 μm, more preferably from 6 to 12 μm. The second active material layer adopts a second active material with an appropriate $D_v50$, which can improve the liquid retention capacity of the negative electrode and increase the energy density of the negative electrode. In addition, the smaller the $D_v50$ of the second active material is, the more sufficient the contact with the electrolyte is, which is more beneficial to the charge exchange between active ions and electrons and thus more beneficial to rapid charging of the battery. The $D_v50$ of the second active material within an appropriate range is also conducive to preparing an active material layer with higher consistency, thereby prolonging the cycle life of the battery.

In some preferred embodiments, the negative electrode simultaneously satisfies that the average particle size $D_v50$ of the first active material is from 8 to 18 μm, and the average particle size $D_v50$ of the second active material is from 5 to 15 μm. The particle sizes of the active materials of the first active material layer and the second active material layer are reasonably combined, which can maintain the stability of the particle accumulation structure during the cycle, thereby inhibiting disordered arrangement of particles between the adjacent active material layers, maintaining appropriate pore structures between the active material particles, and effectively promoting the liquid absorption and storage capacity of the negative electrode and the transport performance of active ions by the negative electrode film with a composite layer structure. Therefore, the battery using the negative electrode can have higher cycle performance and dynamic performance.

The larger the average pore size of the active material is, the electrolyte is easier to diffuse in the particles, so that the liquid absorption capacity is improved. The electrolyte is also easy to fully contact with the active material having a large pore size, which is conductive to the deintercalation of active ions to improve the dynamic performance. The active material with a small average pore size is beneficial to increasing the proportion of the active material per unit volume of the active material layer, thereby increasing the energy density of the negative electrode.

In some embodiments, the average pore size of the first active material may be from 60 to 150 nm, preferably from 70 to 140 nm, and more preferably from 80 to 120 nm. The average pore size of the first active material within an appropriate range can better improve the liquid absorption capacity and dynamic performance of the negative electrode.

In some embodiments, the average pore size of the second active material may be from 5 to 35 nm, preferably from 10 to 30 nm, and more preferably from 15 to 25 nm. Within an appropriate range of the average pore size of the second active material, the negative electrode has high liquid retention, and its energy density can be improved.

In some preferred embodiments, the average pore size of the first active material may be from 60 to 150 nm, preferably from 70 to 140 nm, and more preferably from 80 to 120 nm; and the average pore size of the second active material may be from 5 to 35 nm, preferably from 10 to 30 nm, and more preferably from 15 to 25 nm. The first active material layer close to the negative electrode current collector contains the first active material with a larger average pore size, so that the electrolyte quickly infiltrates the negative electrode by means of capillarity, to improve the liquid absorption speed of a negative electrode plate. Meanwhile, the second active material layer away from the negative electrode current collector contains the second active material with a smaller average pore size, and the smaller porosity of the second active material layer helps to improve the liquid storage capacity of the negative electrode.

The oval-like particles are also called spheroid-like particles, and outer edge surfaces of the particles are roughly three-dimensional curved surfaces. The ratio of short diameter to long diameter of the oval-like active material particles is ≤1. The closer the value is to 1, the more round the particles tend to be, and the larger the shear force between the particles is. The smaller the ratio of short diameter to long diameter is, the more elliptical the particles tend to be, and the particles are intercalated with each other more easily.

In some embodiments, the ratio of short diameter to long diameter of the first active material may be from 0.4 to 1, preferably from 0.5 to 1, and more preferably from 0.6 to 0.9. The ratio of short diameter to long diameter of the first active material within an appropriate range can achieve good contact between the particles, ensure high electronic conductivity of the negative electrode, and increase the porosity of the first active material layer, thereby increasing electrolyte infiltration of the negative electrode.

In some embodiments, the ratio of short diameter to long diameter of the second active material is from 0.3 to 1, preferably from 0.4 to 0.8. The ratio of short diameter to long diameter of the second active material within the appropriate range enables the formation of pores between the particles suitable for electrolyte infiltration, and increases the packing compactness of the particles, thereby improving the electrolyte retention and energy density of the negative electrode.

In some preferred embodiments, the negative electrode simultaneously satisfies: the ratio of short diameter to long diameter of the first active material is from 0.5 to 1, preferably from 0.6 to 0.9; and the ratio of short diameter to long diameter of the second active material is from 0.3 to 1, preferably from 0.4 to 0.8. The arrangement of the active material with a larger ratio of short diameter to long diameter on the negative electrode current collector and the active material with a smaller ratio of short diameter to long diameter on the first active material layer is beneficial to further improving the liquid absorption and storage capacity of the negative electrode.

The active material particles with larger specific surface area have stronger electrolyte adsorption capacity. In some embodiments, the specific surface area of the first active material is larger than that of the second active material. This helps to improve the liquid absorption capacity and liquid storage capacity of the battery.

In some embodiments, the specific surface area of the first active material is preferably from 6.9 to 9.6 $m^2/g$, more preferably from 7.5 to 9.1 $m^2/g$, and particularly preferably from 8.0 to 8.7 $m^2/g$.

In some embodiments, the specific surface area of the second active material is preferably from 1.3 to 3.1 $m^2/g$, and more preferably from 2.0 to 2.5 $m^2/g$.

The apparent density value is the ratio of the mass of the material to the volume of water excluded by the material. The smaller the apparent density value is, the larger the volume of open holes contained in the material is, and the stronger the liquid absorption and storage capacity is. The apparent density value within an appropriate range is also conducive to high energy density of the battery.

In some embodiments, the apparent density of the first active material is preferably from 0.5 to 1.2 $g/cm^3$, more preferably from 0.6 to 1.0 $g/cm^3$.

In some embodiments, the apparent density of the second active material is preferably from 1.5 to 2.0 $g/cm^3$, more preferably from 1.6 to 1.9 $g/cm^3$.

In the negative electrode film of the composite layer structure, the areal density of each active material layer within an appropriate range can further improve the energy density and cycle life of the battery. In addition, the uniformity of the negative electrode can also be improved. The areal density of each active material layer is equal to the mass of the active material layer divided by its area.

In some embodiments, the areal density of the first active material layer is preferably from 20 to 100 $g/m^2$, more preferably from 30 to 90 $g/m^2$.

In some embodiments, the areal density of the second active material layer is preferably from 20 to 100 $g/m^2$, more preferably from 30 to 90 $g/m^2$.

The inventors found by further research that when the ratio of the areal density of the first active material layer to the areal density of the second active material layer is from 0.3 to 3, the energy density and cycle performance of the battery can be further improved. More preferably, the ratio of the areal density of the first active material layer to the areal density of the second active material layer is from 0.5 to 2.

In some embodiments, the porosity of the negative electrode film of the composite layer structure may be from 40.1% to 67.9%, for example, 44.5%, 45.4%, 50%, 55%, 59.9%, 60.5%, 62.5%, 64.5%, 65.2%, 66.5%, 67.9%, etc. Through the reasonable combination of the first active material layer and the second active material layer, the negative electrode film of the composite layer structure can have an appropriate porosity. The secondary battery comprising such negative electrode can have high energy density and cycle performance.

In some optional embodiments, the second active material and the first active material are independently selected from materials capable of receiving and deintercalating lithium ions. The materials capable of receiving and deintercalating lithium ions may include one or more of soft carbon, hard carbon, artificial graphite, natural graphite, silicon, silicon oxides, silicon-carbon composites, lithium titanate, and metals capable of forming alloys with lithium.

In some preferred embodiments, the second active material and the first active material are both artificial graphite.

The artificial graphite with the aforementioned porous structure is commercially available or is prepared by means of methods known in the art. An exemplary preparation method of the artificial graphite as the second active material comprises: uniformly mixing artificial graphite particles with an intercalating agent that can decompose and release gas, wherein the mass percentage of the intercalating agent in the resulting mixture is more than 0% and less than or equal to 5%; performing intercalation reaction at about 100° C. for 1 to 3 h, for example, 2 h, so that the intercalating agent is intercalated between graphite particle layers; and then transferring the reaction product to a sintering furnace, and sintering the same in a protective atmosphere at 800° C.-1000° C. for 8 to 10 h, to obtain active material particles. The intercalating agent may be selected from, but not limited to, one or more of lithium carbonate, sodium carbonate, potassium carbonate, ammonium nitrate, lithium chlorate, ammonium oxalate, and acetic acid.

A similar method can be used to prepare the artificial graphite as the first active material, in which the first active material can obtain a larger average pore size by increasing the amount of the intercalating agent that can decompose and release gas. Further, the first active material can obtain a higher porosity. For example, in the mixture of the artificial graphite particles and the intercalating agent that can decompose and release gas, the mass percentage of the intercalating agent can be from 15% to 35%.

In some embodiments, the negative electrode current collector may be a metal foil, a carbon-coated metal foil or a porous metal plate, preferably a copper foil.

It can be understood that when any of the negative electrode films in the negative electrode has the above-mentioned composite layer structure containing the first active material layer and the second active material layer, it falls within the protection scope of the present application.

In some optional embodiments, the first active material layer and the second active material layer may independently comprise a conductive agent. The present application does not specifically limit the type of the conductive agent, and the conductive agent can be selected according to actual needs. As an example, the conductive agent may comprise one or more of superconducting carbon, acetylene black, carbon black, Ketjen black, carbon dots, carbon nanotubes, graphene, and carbon nanofibers.

In some optional embodiments, the first active material layer and the second active material layer may independently comprise a binder. The present application does not specifically limit the type of the binder, and the binder can be selected according to actual needs. As an example, the binder may be one or more of styrene-butadiene rubber (SBR), styrene-butadiene rubber (SBCs), and water-based acrylic resin.

In some optional embodiments, the first active material layer and the second active material layer may independently comprise a thickener, such as sodium carboxymethyl cellulose (CMC-Na). However, the present application is not limited to this, and can also use other material as a thickener for the negative electrode.

Here, the average particle size $D_v50$ of the active material can be easily measured with a laser particle size analyzer, such as Mastersizer 3000 laser particle size analyzer from Malvern Instruments Co., Ltd., UK.

The specific surface area of the active material is a well-known meaning in the art, and can be measured by instruments and methods known in the art. For example, the specific surface area can be measured by a nitrogen adsorption specific surface area analysis test method and calculated by a BET (Brunauer Emmett Teller) method, wherein the nitrogen adsorption specific surface area analysis test can be carried out by TriStar™ II specific surface and pore analyzer of Micromeritics, USA, and the test can refer to GB/T 19587-2004.

The apparent density of the active material can be measured by instruments and methods known in the art. For details, reference may be made to the national standard GB/T24586-2009 (Iron ores-Determination of apparent density, true density and porosity). An exemplary test method is as follows: putting a certain mass of active material particles in a pycnometer, soaking the same in an appropriate amount of kerosene for a certain period of time, pouring out the excess kerosene, and measuring the volume of the kerosene absorbed by the particles, i.e., the volume of open holes, wherein the apparent density of the particles=particle weight/(true volume+hole volume), Where true volume=particle weight/true density, and the true density can be measured by a true density tester (e.g., AccuPyc™ II 1340).

The ratio of short diameter to long diameter of the active material can be measured by instruments and methods known in the art. An exemplary test method is as follows: a single layer of active material is spread and bound to a conductive adhesive (the active material may be a raw material for preparing the negative electrode film or a sample taken from the formed negative electrode film), adjacent particles are in contact with each other, and a sample to be tested with length x width=5 cm×5 cm is prepared. The particles in the sample to be tested are tested by means of a scanning electron microscope (e.g., ZEISS Sigma™ 300). The test can refer to JY/T010-1996. In order to ensure the accuracy of the test results, at least 50 different particles can be randomly selected from the sample to be tested for scanning test, the ratio of short diameter to long diameter of each particle is calculated, and then an average ratio of short diameter to long diameter of the at least 50 particles, i.e., a ratio of short diameter to long diameter of the active material, is calculated.

The porosity of the negative electrode film is a well-known meaning in the art, and can be measured by instruments and methods known in the art. For details, reference may be made to the national standard GB/T24586-2009 (Iron ores-Determination of apparent density, true density and porosity). Porosity $P=(V_1-V_2)/V_1 \times 100\%$, $V_1$ represents the apparent volume, and $V_2$ represents the true volume.

Secondary Battery

The second aspect of the present application provides a secondary battery, which comprises a positive electrode, a negative electrode, an electrolyte, and a separator, wherein the negative electrode is the negative electrode according to the first aspect of the present application.

In some embodiments, the positive electrode comprises a positive electrode current collector, and a positive electrode film disposed on at least one surface of the positive electrode current collector and comprising a positive active material. The specific type and composition of a positive electrode plate are not limited, and can be selected according to actual needs.

In some embodiments, the positive active material is selected from, but not limited to, one or a mixture of layered lithium transition metal oxides with chemical formula $Li_aM_{1-x}M'_xO_2$ and lithium iron phosphate materials with chemical formula $LiFe_yMn_{1-y-z}M''_zPO_4/C_b$, where $0.95 \leq a \leq 1.1$, $0 \leq x \leq 0.1$, $0.1 \leq y \leq 0.9$, $0 \leq z \leq 0.9$, $b \geq 0$; M is at least one of Co, Mn, and Ni; M' is one or more of Al, Mg, B, Zr, Si, Ti, Cr, Fe, V, Cu, Ca, Zn, Nb, Mo, Sr, Sb, W and Bi; and M" is one or more of Cr, Mg, Ti, Al, Zn, W, Nb, and Zr.

In some embodiments, the positive electrode film may further optionally comprise a conductive agent. The present application does not specifically limit the type of the conductive agent, and the conductive agent can be selected according to actual needs. As an example, the conductive agent may comprise one or more of superconducting carbon, acetylene black, carbon black, Ketjen black, carbon dots, carbon nanotubes, graphene, and carbon nanofibers.

In some embodiments, the positive electrode film may further optionally comprise a binder. The present application does not specifically limit the type of the binder, and the binder can be selected according to actual needs. As an example, the binder may comprise one or more of polyvinylidene fluoride (PVDF), polytetrafluoroethylene (PTFE), ethylene-vinyl acetate copolymer (EVA), and polyvinyl alcohol (PVA).

In some embodiments, the positive electrode current collector may be a metal foil, a carbon-coated metal foil or a porous metal plate, preferably an aluminum foil.

In some embodiments, the electrolyte contains a solvent and a solute. The specific type and composition of the solvent and the solute are not limited, and can be selected according to actual needs. For example, the solvent can be selected from one or more of organic carbonates such as ethylene carbonate, propylene carbonate, dimethyl carbonate, diethyl carbonate, and ethyl methyl carbonate, which are electrically insulating but can conduct ions. The solute can be selected from one or more lithium salts of $LiPF_6$, $LiBF_4$, LiBOB, $LiAsF_6$, $Li(CF_3SO_2)_2N$, $LiCF_3SO_3$, and $LiClO_4$.

In the secondary battery according to the second aspect of the present application, the separator is located between the positive electrode plate and the negative electrode plate to play a role of isolation. The type of the separator is not specifically limited, and the separator can be any separator material used in existing batteries, for example, films of polyethylene, polypropylene, polyvinylidene fluoride, non-woven fabrics and polyfibers, and multilayer composite films thereof.

Figure 2:
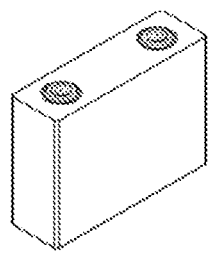
FIG. 2 is a schematic diagram of an embodiment of a secondary battery.

The present application has no particular limitation on the shape of the secondary battery, which may be cylindrical, square or other arbitrary shape. FIG. 2 shows a secondary battery 5 with a square structure as an example.

In some embodiments, the secondary battery may comprise an outer package for packaging a positive electrode plate, a negative electrode plate, a separator and an electrolyte.

In some embodiments, the outer package of the secondary battery may be a soft bag, such as a pouch type soft bag. The material of the soft bag may be plastic, such as one or more of polypropylene (PP), polybutylene terephthalate (PBT), and polybutylene succinate (PBS). The outer package of the secondary battery may also be a hard case, such as a hard plastic case, an aluminum case, or a steel case.

Figure 3:
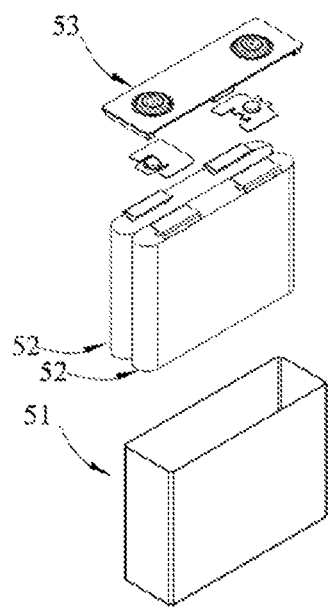
FIG. 3 is an exploded view of FIG. 2.

In some embodiments, referring to FIG. 3, the outer package may comprise a housing 51 and a cover plate 53. The housing 51 may comprise a bottom plate and side plates connected to the bottom plate, and the bottom plate and the side plates form a receiving cavity. The housing 51 has an opening communicated with the receiving cavity, and the cover plate 53 can cover the opening to close the receiving cavity.

The positive electrode plate, the negative electrode plate and the separator may be stacked or wound to form a stacked structure electrode assembly or a wound structure electrode assembly 52. The electrode assembly 52 is packaged in the receiving cavity. The electrolyte infiltrates the electrode assembly 52.

The secondary battery 5 may comprise one or several electrode assemblies 52, which can be adjusted according to requirements.

In some embodiments, the secondary battery can be assembled into a battery module. The battery module may comprise a plurality of secondary batteries, and the specific number can be adjusted according to the application and capacity of the battery module.

Figure 4:
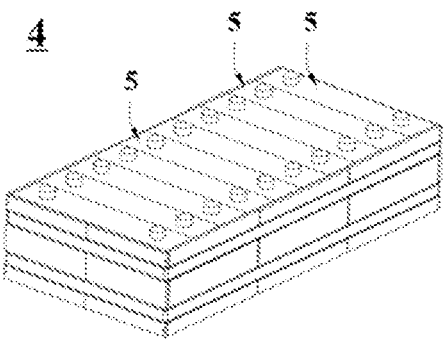
FIG. 4 is a schematic diagram of an embodiment of a battery module.

FIG. 4 shows a battery module 4 as an example. Referring to FIG. 4, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed by fasteners.

Optionally, the battery module 4 may further comprise a housing with a receiving space, and the plurality of secondary batteries 5 are received in the receiving space.

In some embodiments, the above-mentioned battery module may also be assembled into a battery pack, and the number of battery modules contained in the battery pack can be adjusted according to the application and capacity of the battery pack.

Figure 5:
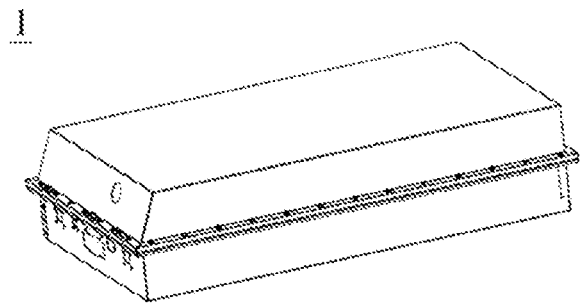
FIG. 5 is a schematic diagram of an embodiment of a battery pack.
Figure 6:
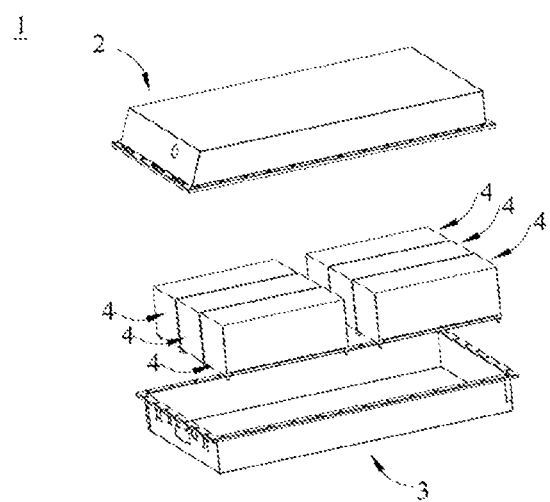
FIG. 6 is an exploded view of FIG. 5.

FIGS. 5 and 6 show a battery pack 1 as an example. Referring to FIGS. 5 and 6, the battery pack 1 may comprise a battery box and a plurality of battery modules 4 disposed in the battery box. The battery box comprises an upper box body 2 and a lower box body 3. The upper box body 2 can cover the lower box body 3 to form a closed space for receiving the battery modules 4. A plurality of battery modules 4 can be disposed in the battery box in any manner.

Device

The third aspect of the present application provides a device, comprising the secondary battery according to the second aspect of the present application. The secondary battery can be used as a power supply of the device, and can also be used as an energy storage unit of the device. The device may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The device may comprise the secondary battery, battery module or battery pack selected according to its usage requirements.

Figure 7:
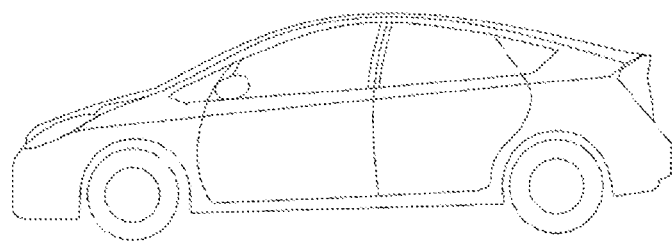
FIG. 7 is a schematic diagram of an embodiment of a device using the secondary battery as a power supply.

FIG. 7 shows a device as an example. The device is a pure electric vehicle, a hybrid electric vehicle, or a plug-in hybrid electric vehicle. In order to meet the requirements of the device for high power and high energy density of batteries, the battery pack or battery module can be used.

As another example, the device may be a mobile phone, a tablet computer, a notebook computer, etc. The device is generally required to be thin and light, and the secondary battery can be used as a power supply.

EXAMPLES

In order to describe the technical contents, structural features, achieved objectives and effects of the technical solutions in detail, the following detailed descriptions will be given in conjunction with specific embodiments. It should be understood that these embodiments are only used for explaining the present application, rather than limiting the scope of the present application. Unless otherwise stated, all parts, percentages, and ratios described in the following embodiments are based on weight, all reagents used in the embodiments are commercially available or synthesized according to conventional methods and can be directly used without further treatment, and all instruments used in the embodiments are commercially available.

The batteries of Examples 1-19 and Comparative Examples 1 and 2 were prepared according to the following methods.

(1) Preparation of Positive Electrode Plate

A nickel cobalt manganese ternary active material $LiNi_{1/3}Co_{1/3}Mn_{1/3}O_2$ as a positive active material, conductive carbon black Super-P, and PVDF as a binder were mixed thoroughly at a weight ratio of 94:3:3 in a solvent system of N-methyl pyrrolidone in a vacuum mixer, wherein the linear mixing speed was controlled to 4-10 m/min, the mixing time was 60-150 min, and the mixing was continued until the system was uniform, thus a positive electrode slurry was obtained; the positive electrode slurry was coated on two surfaces of an Al foil substrate, and a positive electrode plate was obtained by drying, cold pressing, slitting, and cutting.

(2) Preparation of Negative Electrode Plate i. Preparation of negative electrode with single active material layer (the negative electrodes of Comparative Examples 1 and 2 were prepared according to this method)

The negative active material, conductive carbon black Super-P, styrene-butadiene rubber (SBR) as a binder, and sodium carboxymethyl cellulose (CMC-Na) as a thickener shown by Comparative Examples 1 and 2 in Table 1 were mixed thoroughly at a weight ratio of 96:1:2:1 in a solvent system of deionized water to obtain a negative electrode slurry; the negative electrode slurry was uniformly coated on two surfaces of a Cu foil as a negative electrode current collector with reference to the areal densities shown by Comparative Examples 1 and 2 in Table 1, then the coated Cu foil was dried at room temperature and then transferred to an oven to continue drying, and a negative electrode plate was obtained by cold pressing and slitting.

ii. Preparation of negative electrode with double active material layers (the negative electrodes of Examples 1-19 were prepared according to this method)

The first active material, conductive carbon black Super-P, styrene butadiene rubber (SBR) as a binder, and sodium carboxymethyl cellulose (CMC-Na) as a thickener shown by Examples 1-19 in Table 1 were mixed thoroughly at a weight ratio of 96:1:2:1 in a solvent system of deionized water to obtain a slurry A;

The second active material, conductive carbon black Super-P, styrene butadiene rubber (SBR) as a binder, and sodium carboxymethyl cellulose (CMC-Na) as a thickener shown by Examples 1-19 in Table 1 were mixed thoroughly at a weight ratio of 96:1:2:1 in a solvent system of deionized water to obtain a slurry B;

The slurry A was first uniformly coated on two surfaces of a Cu foil as a negative electrode current collector with reference to the areal densities shown by Examples 1-19 in Table 1, then the coated Cu foil was dried at room temperature and transferred to an oven to continue drying, and an electrode plate A coated with the first active material layer was obtained; then two surfaces of the electrode plate A were coated with the slurry B with reference to the areal densities shown by Examples 1-19 in Table 1, followed by drying, cold pressing and slitting, thus obtaining a negative electrode with two active material layers.

The graphite in Table 1 was artificial graphite.

(3) Preparation of Electrolyte

Ethylene carbonate (EC) and ethyl methyl carbonate (EMC) were mixed in a volume ratio of 3:7 to obtain an organic solvent. Fully dried $LiPF_6$ was dissolved in the mixed organic solvent to obtain an electrolyte having a concentration of 1 mol/L.

(4) Preparation of Separator

A PE/PP/PE three-layer porous polymer film was selected as a separator.

(5) Preparation of Lithium-Ion Secondary Battery

The positive electrode plate, the separator, and the negative electrode plate were stacked in order with the separator between the positive and negative electrode plates to serve as an isolation, and then wound to obtain a bare battery core; the qualified bare battery core was welded to a top cover by means of a tab, placed in a housing of an outer package, dried and injected with an electrolyte, and the lithium-ion secondary battery was obtained by vacuum packaging, standing, forming, and shaping.

Test Section (1) The liquid absorption capacity was tested by the following method:

The liquid absorption capacity of electrode plates was tested by an electrolyte immersion method. After the negative electrode plates were cold pressed, respective three negative electrodes obtained in Examples 1-19 and Comparative Examples 1 and 2 were taken, the negative electrode plates were placed in the same weight of electrolyte under the same conditions, immersed at room temperature (25° C.) for 12 h and then taken out, and the electrode plates were weighed before and after immersion; wherein the liquid absorption capacity of an electrode plate=(the weight of the electrode plate after immersion−the weight of the electrode plate before immersion)/the weight of the electrode plate before immersion.

(2) The liquid retention capacity was tested by the following method:

The residual amount of electrolyte in the negative electrode plates under 100N compression force was tested to characterize the liquid retention capacity of electrode plates. After the electrode plates were cold pressed, respective nine negative electrodes obtained in Examples 1-19 and Comparative Examples 1 and 2 were taken, the negative electrode plates were placed in the same weight of electrolyte under the same conditions, immersed at room temperature (25° C.) for 12 h and then taken out, and the electrode plates were weighed before and after immersion, wherein the initial liquid retention of an electrode plate=(the weight of the electrode plate after immersion−the weight of the electrode plate before immersion)/the weight of the electrode plate before immersion.

Then, for each of Examples 1-19 and Comparative Examples 1 and 2 the negative electrode plates that had absorbed the electrolyte were taken, respectively, from six negative electrodes thus obtained, and then placed between two steel plates, similar to a sandwich structure, the steel plate—negative electrode plate—steel plate structure was held by means of a clamp, and a force of 100 N was applied to the clamp by a pressing device; for Examples 1-19 and Comparative Examples 1 and 2, respective three negative electrodes were held for 30 min, respective other three negative electrodes were held for 60 min, and then the application of force stopped; the clamp was removed and opened to taken out the negative electrode plate, and the weight of the negative electrode plate was measured to obtain the liquid retention capacity of the electrode plate under the compression force of 100 N. The liquid retention capacity of the electrode plate=(the weight of the electrode plate after the compression force was applied−the weight of the electrode plate before immersion)/the weight of the electrode plate before immersion.

(3) The cycle performance was tested by the following method:

At room temperature (25° C.), the lithium-ion secondary batteries manufactured from the negative electrodes obtained by the methods of Examples 1-19 and Comparative Examples 1 and 2 were subjected to first charge and discharge at a current of 0.5 C (i.e., the current value of completely discharging the theoretical capacity within 2 h), wherein the charge was constant current and constant voltage charge, the end-of-charge voltage was 4.2 V, the cut-off current was 0.05 C, and the end-of-discharge voltage was 3.0 V; and then the batteries were stood for 24 h. After that, under the same conditions, charge and discharge tests were performed, constant current and constant voltage charge was performed by means of 1 C current, the end-of-charge voltage was 4.2 V, the cut-off current was 0.05 C, discharge was performed by means of 1 C current, the end-of-discharge voltage was 3.0 V, and BOL (Before of life) of the battery, i.e., discharge capacity $C_b$ at the first cycle, was recorded. Then, the cycle life was tested with 1 C/1 C cycles at room temperature, the voltage range was from 3.0 to 4.2 V, the batteries were stood for 5 min between two cycles, and the discharge capacity $C_e$ was recorded for each cycle. The ratio $C_e/C_b$ of $C_e$ to $C_b$ was the capacity retention during the cycle. The capacity retention of the battery after 2000 cycles was tested.

Relevant parameters of the negative electrodes provided by Examples 1-19 and Comparative Examples 1 and 2 were shown in Table 1, the test results of the negative electrodes provided by Examples 1-19 and Comparative Examples 1 and 2 were shown in Table 2, and the test results of the secondary batteries prepared from the negative electrodes provided by Examples 1-19 and Comparative Examples 1 and 2 were shown in Table 3.

TABLE 1

Relevant parameters of negative electrodes provided by Examples 1-19 and Comparative Examples 1 and 2

| | Item | Type of material | Average pore size [nm] | Particle size $D_v50$ [μm] | Short diameter/long diameter ratio | Specific surface area by BET [m²/g] | Areal density of layer [g/m²] |
|---|---|---|---|---|---|---|---|
| Example 1 | First active material | Graphite | 60 | 8 | 0.5 | 6.9 | 60 |
| | Second active material | Graphite | 10 | 8 | 0.4 | 2.2 | 90 |

TABLE 1-continued

Relevant parameters of negative electrodes provided
by Examples 1-19 and Comparative Examples 1 and 2

| Item | | Type of material | Average pore size [nm] | Particle size $D_v50$ [μm] | Short diameter/long diameter ratio | Specific surface area by BET [m²/g] | Areal density of layer [g/m²] |
|---|---|---|---|---|---|---|---|
| Example 2 | First active material | Graphite | 70 | 8 | 1 | 7.5 | 60 |
| | Second active material | Graphite | 10 | 8 | 0.4 | 2.2 | 90 |
| Example 3 | First active material | Graphite | 80 | 8 | 0.6 | 8 | 60 |
| | Second active material | Graphite | 10 | 8 | 0.3 | 2.2 | 90 |
| Example 4 | First active material | Graphite | 100 | 8 | 0.9 | 8.3 | 60 |
| | Second active material | Graphite | 10 | 8 | 1 | 2.2 | 90 |
| Example 5 | First active material | Graphite | 120 | 8 | 0.7 | 8.7 | 60 |
| | Second active material | Graphite | 10 | 8 | 0.8 | 2.2 | 90 |
| Example 6 | First active material | Graphite | 140 | 8 | 0.8 | 9.1 | 60 |
| | Second active material | Graphite | 10 | 8 | 0.7 | 2.2 | 90 |
| Example 7 | First active material | Graphite | 150 | 8 | 1 | 9.6 | 60 |
| | Second active material | Graphite | 10 | 8 | 1 | 2.2 | 90 |
| Example 8 | First active material | Graphite | 100 | 10 | 0.9 | 8.1 | 60 |
| | Second active material | Graphite | 15 | 10 | 0.5 | 2.1 | 90 |
| Example 9 | First active material | Graphite | 100 | 10 | 0.6 | 8.1 | 60 |
| | Second active material | Graphite | 20 | 10 | 0.4 | 2.3 | 90 |
| Example 10 | First active material | Graphite | 100 | 10 | 0.9 | 8.1 | 60 |
| | Second active material | Graphite | 25 | 10 | 0.8 | 2.5 | 90 |
| Example 11 | First active material | Graphite | 100 | 10 | 0.6 | 8.1 | 60 |
| | Second active material | Graphite | 30 | 10 | 0.8 | 2.7 | 90 |
| Example 12 | First active material | Graphite | 100 | 10 | 0.4 | 8.1 | 60 |
| | Second active material | Graphite | 5 | 10 | 0.8 | 1.3 | 90 |
| Example 13 | First active material | Graphite | 100 | 10 | 0.7 | 8.1 | 60 |
| | Second active material | Graphite | 35 | 10 | 0.5 | 3.1 | 90 |
| Example 14 | First active material | Graphite | 100 | 8 | 0.5 | 8.6 | 60 |
| | Second active material | Graphite | 20 | 5 | 0.3 | 2.7 | 90 |
| Example 15 | First active material | Graphite | 100 | 8 | 0.9 | 8.6 | 60 |
| | Second active material | Graphite | 20 | 12 | 0.4 | 1.9 | 90 |
| Example 16 | First active material | Graphite | 100 | 8 | 0.9 | 8.6 | 60 |
| | Second active material | Graphite | 20 | 10 | 0.3 | 2.3 | 90 |
| Example 17 | First active material | Graphite | 100 | 18 | 0.9 | 7.2 | 60 |
| | Second active material | Graphite | 20 | 10 | 1 | 2.3 | 90 |
| Example 18 | First active material | Graphite | 100 | 13 | 1 | 7.9 | 60 |
| | Second active material | Graphite | 20 | 10 | 0.3 | 2.3 | 90 |
| Example 19 | First active material | Soft carbon | 100 | 13 | 1 | 7.5 | 60 |
| | Second active material | Soft carbon | 20 | 10 | 0.3 | 2.0 | 90 |
| Comparative Example 1 | Active material | Graphite | 100 | 8 | 0.7 | 8.6 | 150 |
| Comparative Example 2 | Active material | Graphite | 20 | 10 | 0.5 | 2.3 | 150 |

Table 2 Test results of negative electrodes provided by Examples 1-19 and Comparative Examples 1 and 2

| Item | Porosity [%] | Liquid absorption capacity [%] | Initial liquid retention capacity [%] | Liquid retention capacity after 30 min of compression force [%] | Liquid retention capacity after 60 min of compression force [%] |
|---|---|---|---|---|---|
| Example 1 | 41.3 | 32.20 | 32.84 | 29.56 | 26.60 |
| Example 2 | 45.4 | 35.42 | 36.13 | 32.52 | 29.26 |
| Example 3 | 50.0 | 38.96 | 39.74 | 35.77 | 32.19 |
| Example 4 | 55.0 | 42.86 | 43.72 | 39.34 | 35.41 |
| Example 5 | 49.5 | 38.57 | 39.34 | 35.41 | 31.87 |
| Example 6 | 44.5 | 34.72 | 35.41 | 31.87 | 28.68 |
| Example 7 | 40.1 | 31.24 | 31.87 | 28.68 | 25.81 |
| Example 8 | 60.5 | 47.14 | 48.09 | 43.28 | 38.95 |
| Example 9 | 66.5 | 51.86 | 52.90 | 47.61 | 42.85 |
| Example 10 | 59.9 | 46.67 | 47.61 | 42.85 | 38.56 |
| Example 11 | 53.9 | 42.01 | 42.85 | 38.56 | 34.70 |
| Example 12 | 48.5 | 37.80 | 38.56 | 34.70 | 31.23 |
| Example 13 | 43.7 | 34.02 | 34.70 | 31.23 | 28.11 |
| Example 14 | 67.9 | 50.82 | 53.95 | 48.56 | 43.70 |
| Example 15 | 65.2 | 49.78 | 51.84 | 46.65 | 41.99 |
| Example 16 | 66.5 | 51.86 | 52.90 | 47.61 | 42.85 |
| Example 17 | 62.5 | 48.75 | 49.72 | 44.75 | 40.27 |
| Example 18 | 64.5 | 50.30 | 51.31 | 46.18 | 41.56 |
| Example 19 | 64.2 | 49.56 | 50.81 | 45.78 | 40.96 |
| Comparative Example 1 | 28.9 | 22.54 | 22.99 | 20.69 | 18.62 |
| Comparative Example 2 | 22.7 | 17.71 | 18.06 | 16.26 | 14.63 |

Table 3 Test results of lithium-ion secondary batteries prepared from negative electrodes provided by Examples 1-19 and Comparative Examples 1 and 2

| Item | Cycle performance Capacity retention cycle after 2000 cycles [%] |
|---|---|
| Example 1 | 80.82 |
| Example 2 | 83.17 |
| Example 3 | 85.18 |
| Example 4 | 86.75 |
| Example 5 | 85.02 |
| Example 6 | 83.32 |
| Example 7 | 81.65 |
| Example 8 | 88.49 |
| Example 9 | 90.22 |
| Example 10 | 88.42 |
| Example 11 | 86.65 |
| Example 12 | 84.92 |
| Example 13 | 83.22 |
| Example 14 | 89.32 |
| Example 1 | 87.52 |
| Example 16 | 90.22 |
| Example 17 | 86.61 |
| Example 18 | 88.42 |
| Example 19 | 87.92 |
| Comparative Example 1 | 72.74 |
| Comparative Example 2 | 66.53 |

It can be seen from the test data that, compared with Comparative Examples 1 and 2, the negative electrode film with a composite layer structure was used in Examples 1-18 of the present application, wherein the first active material in the first active material layer and the second active material in the second active material layer were oval-like particles with through holes and/or blind holes, and the average pore size of the first active material was greater than that of the second active material, so that the negative electrode had good accumulation performance of active material particles, while the liquid absorption and storage capacity of the negative electrode can be greatly increased, and the cycle life of the secondary battery comprising the negative electrode can be prolonged on the premise of high energy density.

Examples 1-7 showed that, by changing the average pore size of the first active material, its apparent density and specific surface area were changed accordingly, and particularly, such change affected the liquid absorption and retention performance and cycle capacity of the electrode plate. It can also be seen that the average pore size was preferably controlled within a range of 70 to 140 nm, more preferably 80 to 120 nm, which can further improve the liquid absorption and retention capacity of the negative electrode, thereby further improving the cycle performance of the battery.

In Examples 8-13, the pore size of particles of the first active material layer was kept unchanged, but the average pore size of particles of the second active material layer was changed, the apparent density and specific surface area of the second active material layer were changed accordingly, and particularly, such change affected the liquid absorption and retention performance and cycle capacity of the electrode plate. It can also be seen that the average pore size of the second active material was preferably controlled within a range from 10 to 30 nm, more preferably 15 to 25 nm, which can further improve the liquid absorption and retention capacity of the negative electrode and further improve the cycle performance of the battery.

In Examples 14-18, the average pore sizes of particles of the two active material layers were kept unchanged, the particle sizes $D_v50$ and short diameter/long diameter ratios of particles of the first and second active material layers were changed, and the apparent density and specific surface area of the active material layers were changed accordingly. It can be seen that, when the combination of the first active material and the second active material was optimized, the liquid absorption and retention capacity of the negative electrode can be further improved, and the cycle performance of the battery can be further improved.

It should be noted that although the embodiments have been described above, the scope of patent protection of the present application is not limited thereto. Therefore, based on the innovation idea of the present application, any alterations and modifications made to the embodiments of the present application, or equivalent structures or equivalent flow transformations made by means of the description and accompanying drawings of the present application, directly or indirectly use the above technical solutions to other related technical fields, and shall fall within the scope of patent protection of the present application.

What is claimed is:

1. A negative electrode, comprising:
a negative electrode current collector;
a first active material layer close to the negative electrode current collector, the first active material layer comprising a first active material; and a second active material layer disposed on a surface of the first active material layer away from the negative electrode current collector, the second active material layer comprising a second active material;
wherein the first active material and the second active material are independently oval-like particles with through holes and/or blind holes, and the first active material has an average pore size greater than that of the second active material,
wherein the first active material has an average pore size from 70 to 140 nm, and the second active material has an average pore size from 10 to 30 nm;
wherein a ratio of short diameter to long diameter of the first active material is from 0.5 to 0.9; and a ratio of short diameter to long diameter of the second active material is from 0.3 to 0.8;
wherein the first active material has a porosity greater than that of the second active material;
wherein the first active material has a particle size Dv50 from 8 to 18 μm; and/or the second active material has a particle size $D_v50$ from 5 to 15 μm; and
wherein the second active material and the first active material are carbon-based materials.

2. The negative electrode according to claim 1, wherein the first active material has an average pore size from 80 to 120 nm; and/or
the second active material has an average pore size from 15 to 25 nm.

3. The negative electrode according to claim 1, wherein a ratio of short diameter to long diameter of the first active material is from 0.6 to 0.9; and/or
a ratio of short diameter to long diameter of the second active material is from 0.4 to 0.8.

4. The negative electrode according to claim 1, wherein the first active material has a specific surface area from 6.9 to 9.6 m²/g; and/or
the second active material has a specific surface area from 1.3 to 3.1 m²/g.

5. The negative electrode according to claim 1, wherein the first active material has an apparent density from 0.5 to 1.2 g/cm³; and/or
the second active material has an apparent density from 1.5 to 2.0 g/cm³.

6. The negative electrode according to claim 1, wherein the of the first active material layer has an areal density from 20 to 100 g/m²; and/or
the second active material layer has an areal density from 20 to 100 g/m².

7. The negative electrode according to claim 1, wherein a ratio of the areal density of the first active material layer to the areal density of the second active material layer is from 0.3 to 3.

8. The negative electrode according to claim 1, wherein the second active material and the first active material independently comprise one or more of soft carbon, hard carbon, artificial graphite, and natural graphite.

9. The negative electrode according to claim 8, wherein the second active material and the first active material are both artificial graphite.

10. A secondary battery, comprising the negative electrode according to claim 1.

11. The secondary battery according to claim 10, wherein the secondary battery comprises a lithium-ion secondary battery.

12. A device, comprising the secondary battery according to claim 10.

13. The negative electrode according to claim 1, wherein the first active material has a particle size Dv50 from 10 to 16 μm; and/or
the second active material has a particle size $D_v50$ from 6 to 12 μm.

14. The negative electrode according to claim 1, wherein the first active material has a specific surface area from 8 to 8.7 m²/g; and/or
the second active material has a specific surface area from 2 to 2.5 m²/g.

15. The negative electrode according to claim 1, wherein the first active material has an apparent density from 0.6 to 1.0 g/cm³; and/or
the second active material has an apparent density from 1.6 to 1.9 g/cm³.

16. The negative electrode according to claim 1, wherein the of the first active material layer has an areal density from 30 to 90 g/m²; and/or
the second active material layer has an areal density from 30 to 90 g/m².

17. The negative electrode according to claim 1, wherein a ratio of the areal density of the first active material layer to the areal density of the second active material layer is from 0.5 to 2.

* * * * *